(12) United States Patent
Huang

(10) Patent No.: US 6,946,164 B2
(45) Date of Patent: Sep. 20, 2005

(54) THIN NANOMETER-CONTROLLED POLYMER FILM GRADIENT

(75) Inventor: Xueying Huang, Hockessin, DE (US)

(73) Assignee: E.I. du Pont Nemours and Company, Wilmington, DE (US)

( * ) Notice: Subject to any disclaimer, the term of this patent is extended or adjusted under 35 U.S.C. 154(b) by 12 days.

(21) Appl. No.: 10/800,271

(22) Filed: Mar. 12, 2004

(65) Prior Publication Data

US 2004/0191421 A1 Sep. 30, 2004

Related U.S. Application Data

(60) Provisional application No. 60/457,787, filed on Mar. 26, 2003.

(51) Int. Cl.[7] .................................................. B05D 1/36
(52) U.S. Cl. ...................................... 427/387; 427/407.1
(58) Field of Search ............................... 427/387, 407.1

(56) References Cited

U.S. PATENT DOCUMENTS 6,336,966 B1 * 1/2002 Coca et al. .................. 106/499
2002/0106513 A1 * 8/2002 Matyjaszewski et al. ... 428/404

OTHER PUBLICATIONS

Zhang et al, Biomaterials, 19, pp 953–960, 1998.*
Shah et al, Macromolecules, 33, pp 597–605, 2000.*
Perruchot et al, Langmuir, 17, pp 4479–4481, 2001.*
Ostuni et al, Langmuir, 17, pp 5605–5620, 2001.*
Coessens et al, Prog. Polym. Sci., 26, pp 337–377, 2001.*
Bai et al, Chinese Journal of Polymer Science, 20(3), pp 261–267, 2002.*
Ramakrishnan et al, Macromolecular Rapid Communications, 23(10/11), pp 612–616, 2002.*
Yu et al, Journal of Physical Chemistry, 107(37), pp 10198–10205, 2003.*
Neugebauer et al, Polymer Preprints, 44(1), pp 508–509, 2003.*
Kurjata et al, Polymer, 45(18), pp 6111–6121, 2004.*
Chapman et al., Polymeric Thin Films That Resist the Adsorption of Proteins and the Adhesion of Bacteria, Langmuir, 1225–1233, vol. 17, No. 4, 2001.
Kong et al., Amphiphilic Polymer Brushes Grown from the Silicon Surface by Atom Transfer Radical Polymerization, Macromolecules, 34, 1837–1844, 2000.

* cited by examiner

Primary Examiner—Erma Cameron

(57) ABSTRACT

This invention relates to a process that uses Surface Atom Transfer Radical Polymerization (SATRP) to grow thin polyethylene glycol alkyl acrylate (PEGAA) polymer film gradients on the moiety accepting surface of a substrate. This invention also relates to a method for producing thin PEGAA polymer film gradients having specific surface functionalities, a thickness ranging from about 0.5 nm to about 5000 nm, and a polymer chain density ranging from 0.1 to 100% surface coverage.

23 Claims, 7 Drawing Sheets

THIN NANOMETER-CONTROLLED POLYMER FILM GRADIENT

This application claims the benefit of U.S. Provisional Application No. 60/457,787, filed Mar. 26, 2003.

FIELD OF THE INVENTION

This invention relates to a process for using Surface Atom Transfer Radical Polymerization (SATRP) to grow thin polyethylene glycol alkyl acrylate (PEGAA) polymer film gradients on the moiety accepting surface of a substrate. This invention also relates to a process for producing thin PEGAA polymer film gradients having a graded increase/decrease in thickness ranging from about 0.5 nm to about 5000 nm and a polymer chain density ranging from 0.1 to 100% surface coverage. This invention further relates to the articles coated with such gradient films. The PEGAA film gradient of the present invention is useful for various kinds of plastic and coating materials.

TECHNICAL BACKGROUND

Shah et al. Macromolecules 2000, 33, 597–605 (2000), describes the use of atom transfer radical polymerization (ATRP) to grow polymer brushes on monolayers of (BrC($CH_3$)$_2$COO($CH_2$)$_{10}$S)$_2$ that have been self-assembled onto gold substrates. The polymer brushes act as barriers to wet chemical etchants of gold enabling patterns to be transferred into the gold substrates underlying the brushes.

Chapman et al., Langmuir, 1225–1233, Vol. 17, No. 4 (2001), describes the use of grafting to produce a protein and bacteria resistant surface. In this process, polyamines are reacted with carboxylic anhydride groups contained in the self-assembled monolayers (SAMs) in order to produce a polymer layer having multiple amino groups, which are then acylated to introduce protein and bacteria resistant functional groups.

Kong et al, Macromolecules, 34, 1837–1844 (2000), describes a process for preparing etching barriers for microlithographic applications.

This process involves using atom transfer radical polymerization (ATRP) in conjunction with two different SAMs to grow poly(methyl methacrylate)(PMMA) and poly(acrylamide) (PAAM) homopolymer brushes on an initiator coated silicon surface.

Although other polymers have been assembled into monolayers onto substrates so as to produce surfaces resistant to the adsorption of proteins and biological cells, this invention discloses new surface materials, i.e. PEGAA monomers that may be grown through an SATRP process in a stepwise and controlled manner on SAMs comprising initiator molecules and optionally spacer molecules. By using this process, a polymeric PEGAA film gradient having the desired graded increase/decrease in thickness can be easily grown on the moiety accepting surface of a substrate having any shape. The process according to this invention also enables a polymeric PEGAA film gradient having a particular increase/decrease in thickness, or polymer chain density to be efficiently and accurately deposited on any moiety accepting substrate surface, wherein the increase/decrease in thickness that is specified is within the range of from about 0.5 nm to about 5000 nm and the polymer chain density specified is within the range of from about 0.1 to about 100%.

The present invention advantageously enables the graded increase of the PEGAA film gradient to be determined by adjusting either the polymer chain length, or the molecular weight and concentration of the monomer from which the repeat units of the PEGAA polymer are derived. This process further allows the graded increase of the PEGAA film gradient to be controlled by the length of time the polymer chains are permitted to grow/polymerize.

SUMMARY OF THE INVENTION

This invention concerns a first process for growing a PEGAA gradient film on substrates having a moiety accepting surface comprising
(a) contacting at least one initiator molecule with the moiety accepting surface of the substrate to form an initiator coated substrate, said initiator molecule comprising at least one of

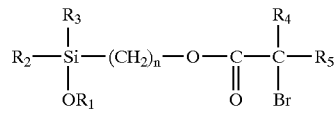

i)
wherein:
n is an integer of 1 to 50;
$R_1$ and $R_4$ are each independently a $CH_3$, $C_2H_5$, or an alkyl of 3 to 20 carbons;
$R_2$ and $R_3$ are each independently a $CH_3$, $C_2H_5$, $OR_1$, or an alkyl of 3 to 20 carbons; and
$R_5$ is a H, $CH_3$, $C_2H_5$, or an alkyl of 3 to 20 carbons,

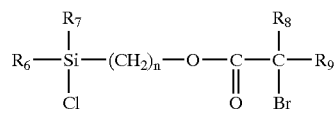

ii)
wherein:
n is an integer of 1 to 50;
$R_6$ and $R_7$ are each independently Cl, $CH_3$, $C_2H_5$, or an alkyl of 3 to 20 carbons;
$R_8$ is a $CH_3$, $C_2H_5$, or an alkyl of 3 to 20 carbons; and
$R_9$ is a H, $CH_3$, $C_2H_5$, or an alkyl of 3 to 20 carbons, and
iii) mixtures thereof;
(b) adding a first and second layer of liquid to a coating container, said first and second layer of liquid being added as separate discreet additions to said container; wherein said first liquid layer comprises polyethylene glycol alkyl acrylate monomers in solution and said second liquid layer comprises a liquid having a different polyethylene glycol alkyl acrylate monomer concentration than said first liquid layer;
wherein said polyethylene glycol alkyl acrylate monomer has the general formula:

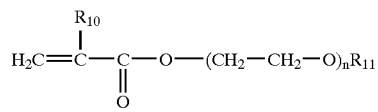

wherein:
n is an integer of 1 to 100; and
$R_{10}$ and $R_{11}$ are each independently H, CH3, $C_2H_5$, or an alkyl of 1 to 20 carbons; and
wherein at least one catalyst and optionally at least one ligand are added to the solution containing the polyethylene glycol alkyl acrylate monomer;
(c) inserting the initiator-coated substrate of step (a) into the coating container; and (d) allowing a sufficient amount of time for diffusion of the polyethylene glycol alkyl acrylate monomer to occur between said first and second liquid layers, wherein a polyethylene glycol alkyl acrylate gradient is grown on the surface of the initiator-coated substrate.

This invention also concerns a second process for growing a PEGAA gradient film on a substrate in which step (a) of the first process further involves contacting the moiety accepting surface of the substrate with a spacer molecule.

This invention also relates to a substrate having a moiety accepting surface with a PEGAA film gradient grown thereon in accordance with either the first, or second process for growing a PEGAA film gradient.

DETAILED DESCRIPTION OF THE INVENTION

Figure 1:
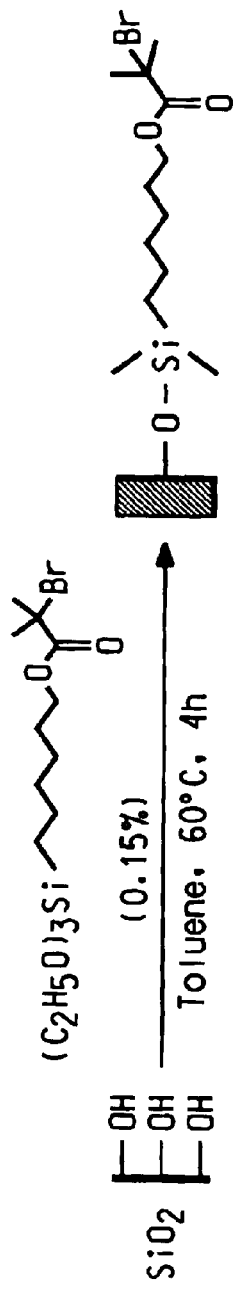
FIG. 1 shows an initiator molecule that is self-assembled into a monolayer on the surface of a substrate.

The term "grow" and any variation thereof, such as "grown" or "growing" is used herein in the same way that the term "polymerizing" is commonly used. More precisely, the term grow describes the chemical reaction by which two or more small molecules (monomers) are combined to form larger or longer molecules (polymers, macromolecules) that contain repeating structural units of the original molecules. The term "gradient" as used herein means a graded increase or decrease in the thickness of the PEGAA layer on the surface of the substrate per unit distance in a specified direction.

The term "diffusion" as used herein means the spontaneous migration of substances from regions of high concentration to regions of low concentration.

The process according to the present invention utilizes the SATRP process generally described in "Functional Polymers by Atom Transfer Radical Polymerization" by Coessens, et al., Progress in Polymer Science 26 (2001) 337–377, which is hereby incorporated by reference, to grow a thin PEGAA film gradient on the surface of an initiator coated substrate.

In accordance with the process of the present invention, the moiety accepting surface of a substrate is first contacted with initiator molecules to form an initiator-coated substrate. The initiator-coated substrate is then contacted, in a coatings container, with a first and second liquid layer so as to form a thin PEGAA polymer film gradient on the surface of the substrate. The first liquid layer contains PEGAA monomers in solution, at least one catalyst, optionally at least one ligand, and optionally at least one additional liquid or solvent. The second liquid layer contains a liquid having a PEGAA monomer concentration that is either less than, or greater than the PEGAA monomer concentration contained in the first liquid layer. Optionally the second liquid may contain no PEGAA monomer. The difference in PEGAA monomer concentrations causes the more concentrated liquid layer to diffuse across the surface of the initiator-coated substrate into the less concentrated liquid layer, thereby resulting in the growth of a PEGAA film gradient having a graded increase/decrease in thickness across the surface of the substrate. Optionally, the moiety accepting surface of the substrate is contacted with a mixture of initiator and spacer molecules, and then further contacted with the first and second liquid layers as indicated herein above.

The SATRP process utilized by the present invention to grow a thin PEGAA gradient film on the moiety accepting surface of a substrate can be used as surface materials in many commercial applications including, but not limited to coating microchips, such as for example to facilitate biological and chemical separation, forming linear color gradients, such as for example to facilitate color comparison in the automotive and hair color industries, coating pharmaceuticals, nutraceuticals, and diagnostic imaging agents, such as for example to control the release of the active ingredients, and in the biomedical arts, such as for example to produce a biological ligand gradient that bind with proteins and/or cells to form gradient biomaterials.

The Substrate

The substrate surfaces onto which the thin PEGAA gradient films of the present invention can be grown include any substrate that has a surface capable of accepting at least one moiety. Examples of such substrates include, but are not limited to glass, metal oxide, silicon, fabrics, porous substrates, quartz, polymeric substrates reinforced with other inorganic material, zirconia and polymeric resins. The substrate may also take any desired size or shape, such as a square, a round flat chip, or a sphere.

As is generally known in the art, the surface of the substrate will contain a moiety accepting group, such as for example hydroxyl groups, thiol groups, carboxyl groups or mixtures thereof. The density of these moiety accepting groups is a function of the type of substrate being used, as well as, any steps of preparation that involve exposing the surface of the substrate to chemicals. For example, using known techniques, such as those involving acids, the surface of the substrate can be cleaned and left in a hydrophilic state. Moiety accepting groups may also be introduced onto the surface of the substrate by being exposed to chemicals, corona discharge, plasma treatment, etc. For example, piranha solution can be used to hydroxylate the surface of a silicon substrate. Some substrates may have moiety accepting groups available on their surface that are intrinsic to the substrate.

The Initiator Molecule

In general, the initiator molecules that may be used in accordance with the invention include, but are not limited to, those having the following formulas:

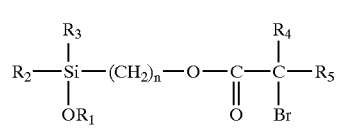

A.

where $R_1$ is a $CH_3$, $C_2H_5$, or an alkyl of 3 to 20 carbons; $R_2$ is a $CH_3$, $C_2H_5$, $OR_1$, or an alkyl of 3 to 20 carbons; $R_3$ is a $CH_3$, $C_2H_5$, $OR_1$, or an alkyl of 3 to 20 carbons; $R_4$ is a $CH_3$, $C_2H_5$, or an alkyl of 3 to 20 carbons; $R_5$ is a H, $CH_3$, $C_2H_5$, or an alkyl of 3 to 20 carbons, and n is an integer of 1 to 50; and

B.

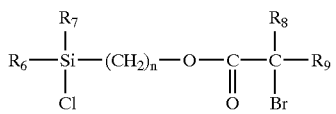

where $R_6$ is a Cl, $CH_3$, $C_2H_5$, or an alkyl of 3 to 20 carbons; $R_7$ is a Cl, $CH_3$, $C_2H_5$, or an alkyl of 3 to 20 carbons; $R_8$ is a $CH_3$, $C_2H_5$, or an alkyl of 3 to 20 carbons; $R_9$ is a H, $CH_3$, $C_2H_5$, or an alkyl of 3 to 20 carbons, and n is an integer of 1 to 50.

However, the preferred initiator molecule is 5'-(triethoxylsilylpentyl) 2-bromo-2-methylpropionatecan and can be prepared for assembly onto the surface of a hydroxylated substrate in accordance with the following reaction scheme. First, the formula (I) 1,2-dibromo, 2-methyl propanoic acid is reacted with the formula (II) 5-hexen-1-ol to produce the formula (III) intermediate compound pent-4'-enyl-2-bromo-2-methyl propionate.

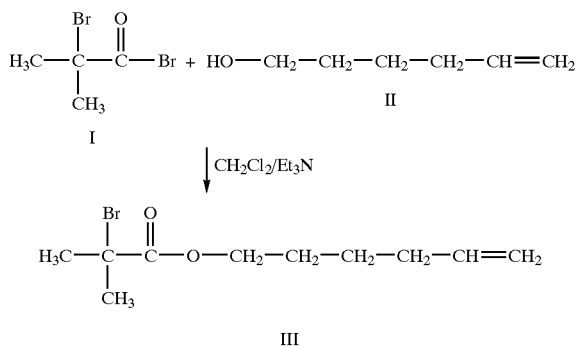

The formula III intermediate compound is then reacted in the presence of at least one catalyst and optionally at least one solvent, as set forth herein below, with formula (IV) triethoxysilane to produce the formula (V) initiator 5'-(triethoxylsilylpentyl)2-bromo-2-methylpropionate.

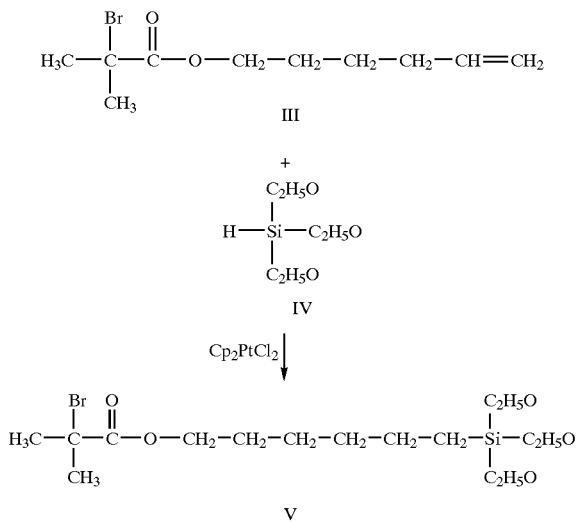

The solvents optionally used in synthesizing initiator molecules includes polar solvents, such as alcohol, acetone, and methanol, and nonpolar solvents, such as dry organic solvents, e.g., toluene, hexene, and heptane. Preferably, however, nonpolar solvents are used.

As further illustrated in FIG. 1, the formula (V) initiator molecules are then assembled as a monolayer onto the hydroxylated surface of the substrate. A person of ordinary skill in the art, however, would know how to modify this reaction scheme in order to accommodate the assembly of initiator molecules onto other moiety accepting substrate surfaces, such as for example a substrate surface having thiol or carboxyl groups attached thereto. A person of ordinary skill in the art would also recognize that this is just one of the many available ways for preparing initiator molecules useful in the process of this invention.

The initiator molecules can be assembled as monolayers onto the moiety accepting surface of a substrate in the absence or presence of various readily available solvents. The species of solvents that can optionally be used are not particularly restricted, and include the following examples: water; hydrocarbon solvents, such as toluene and benzene; ether solvents, such as diethyl ether and terahydrofuran; halogenated hydrocarbon solvents, such as methylene chloride and chloroform; ketone solvents, such as acetone, methyl ethyl ketone and methyl isobutyl ketone; alcohol solvents, such as methanol, ethanol, propanol, isopropanol, n-butyl alcohol and tert-butyl alcohol; nitrile solvents, such as acetonitrile, propionitrile and benzonitrile; ester solvents, such as ethyl acetate and butyl acetate; carbonate solvents, such as ethylene carbonate and propylene carbonate; inorganic solvents; and mixtures of water and organic solvents. However, nonpolar solvents are preferably used. These solvents may be used alone or in combination as an admixture and are readily available commercially. For example, toluene, as well as the other solvents listed hereinabove, can be readily obtained from Aldrich Chemical Co., P.O. Box 2060, Milwaukee, Wis., 53201.

The percentage by volume of solvent optionally used in assembling the initiator molecules on the substrate surface ranges from about 0.05% to about 25%, preferably from about 0.1% to about 5%. The initiator molecules are assembled onto the substrate surface at a temperature ranging from 0° C. to about 130° C., preferably from room temperature to about 100° C. The substrate surface is exposed to initiator molecules for a period of time ranging from about 1 minute to about 1 week, preferably from about 5 minutes to about 60 minutes.

Other methods well known to those skilled in the art for assembling initiator molecules onto the surface of the substrate, such as for example vapor deposition, can also be used in accordance with the process of this invention.

In addition, the surface density of the initiator molecules, and hence the potential surface density of the PEGAA polymer film gradient grown thereon, ranges from 0.1 to 100%, more preferably 5% to 100%, and most preferably 25% to 100%. The surface density of the initiator molecules is defined either as the number of initiator molecules contained per unit $cm^2$ on the surface of a substrate, or as the percent of the total surface area occupied by initiator molecules when the SAM is comprised of both initiator and spacer molecules.

After the initiator molecules, and optionally the spacer molecules, are assembled onto the surface of the substrate, the substrate is preferably cured sufficiently to permit complete covalent bonding of the initiator molecules to the substrate, for example, by heating, preferably to a temperature ranging from about 100° C. to about 180° C. for a time period, ranging preferably from about 30 minutes to about 10 hours, and more preferably for a time period of about 1 hour. Other methods of curing that are sufficient to permit complete covalent bonding of the initiator molecules to the substrate will be apparent to those skilled in the art. The level of curing will contribute to the stability of the final film.

The First and Second Liquid Layers

The initiator-coated substrate is then contacted in a coatings container with the first and second liquid layers. The first liquid layer contains PEGAA monomers in solution, at least one catalyst, and optionally at least one ligand. Optionally, the first liquid layer may be further mixed with a polar solvent or other suitable liquid or solvent.

The PEGAA monomers that may be used in accordance with the present invention include, but are not limited to PEGAAs having the following general formula:

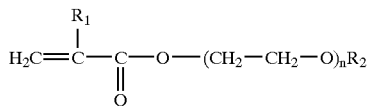

where $R_1$ is a H, CH3, $C_2H_5$, or an alkyl of 1 to 20 carbons, preferably 1 to 10 carbons, most preferably 1 to 5 carbons; $R_2$ is a H, CH3, $C_2H_5$, or an alkyl of 1 to 20 carbons, preferably 1 to 10 carbons, most preferably 1 to 5 carbons and n is an integer of 1 to 100. However, polyethylene glycol methacrylate (PEGM) is preferred.

PEGAA monomers are readily available commercially. For example, PEGM can be obtained from Aldrich Chemical Co., P.O. Box 2060, Milwaukee, Wis., 53201.

The catalyst contained in the first liquid layer includes, but is not limited to metal complexes that contain an element from group 7, 8, 9, 10, 11 of the periodic table as the central metal atom in the metal complex. Preferably, the central metal atom is copper, nickel, ruthenium or iron, and in particular, monovalent copper, divalent ruthenium and divalent iron is more preferred as the central metal atom. However, copper is most preferred as the central metal atom. Examples of the copper containing catalysts preferably used include cuprous chloride, cupric chloride, cuprous bromide, cuprous iodide, cuprous cyanide, cuprous oxide, cuprous acetate, cuprous perchlorate and the like. However, the copper catalysts most preferably used are cuprous chloride and cupric chloride. The ratio of cuprous chloride (copper (I) chloride) to cupric chloride (copper (II) chloride) ranges from 0.1 to 100, more preferably from 2:1 to 50:1, and most preferably from 3:1 to 10:1.

Optionally, if a copper compound is used, a ligand, such as 2,2'-bipyridyl or a derivative thereof, 1,10-phenanthroline or a derivative thereof, and an alkylamine, such as tributylamine or a polyamine, such as tetramethylethylenediamine, pentamethyldiethylenetriamine and hexamethyltriethylenetetraamine, is added to enhance the catalytic activity.

A tristriphenylphosphine complex of divalent ruthenium ($RuCl_2(PPh_3)_3$), as well as, a tristriphenylphosphine complex of divalent iron ($FeCl_2(PPh_3)_3$) are also well suited for use as the catalyst. When the tristriphenylphosphine complex of divalent ruthenium is used as the catalyst, an aluminum compound, such as trialkoxyaluminum is added to increase the activity of the catalyst.

Optionally, other suitable liquids or solvents, such as organic solvents, e.g. acetone and methanol, or mixtures thereof and polar solvents, such as water can be added to the first liquid layer. However, a polar solvent, such as water, is preferably added.

The concentration of the PEGAA monomer solution, whether additional liquids or solvents are added thereto or not, will preferably range from about 5% to about 100% and more preferably from about 40% to about 70%. Furthermore, the molar ratio of catalyst to PEGAA monomer ranges from 1:5 to 1:500 and more preferably from 1:20 to 1:100, and the molar ratio of ligand to catalyst preferably ranges from 1:2 to 1:3.

The second liquid layer that is used in accordance with the process of the invention can be any liquid that has a PEGAA monomer concentration that is different from the PEGAA monomer concentration of the first liquid layer and is miscible with the first liquid layer. Optionally the second liquid may contain no monomer. For example, liquids that may be used as the second liquid layer include, but are not limited to PEGAA monomer solutions that are more concentrated than the PEGAA monomer solution of layer one, monomer solutions that are less concentrated than the monomer solution of layer one, organic solvents without a monomer, such as methanol, ethanol, and acetone, and polar solvents, such as water.

In adding the first and second liquid layers to the coatings container, it is preferred if the two layers be added in separate and distinct steps so as not to cause the two layers to unduly mix. Methods for adding liquid layers so as to prohibit, or at least limit the mixing of layers, will be well-known to those of ordinary skill in the art. At least one acceptable method for depositing a liquid layer onto the surface of another liquid layer, for example, employs the use of a pipette, wherein the tip of the pipette is rested against the side of the coatings container so as to allow the subsequent liquid layer to gently cascade down the side of the coating container and onto the surface of the liquid layer already present in the container. Another method for adding the two liquid layers to the coating container employs the use of a mechanical valve that is strategically positioned in-between the two liquid layers so as to prevent diffusion/mixing of the layers until such time as the mechanical valve is removed/opened.

The order in which the first and second liquid layers are added to the container is not important. For example, the first layer can be added first and the second layer can be added second, or the second layer can be added first and the first layer can be added second. The order in which the two layers are added to the container simply causes the PEGAA film gradient to increase in thickness along the surface of the substrate in the direction heading from the more concentrate layer to the less concentrate layer. For example, if the first liquid layer is more concentrated than the second liquid layer, the portion of the substrate that is immersed in the separately added first liquid layer, and is at the furthest point away from the edge where the first and second layers meet, will have the thinnest layer of PEGAA film grown thereon, with the thickness of the PEGAA gradient film layer increasing across the surface of the substrate in the direction heading away from the first liquid layer and into the second liquid layer so that the thickest part of the PEGAA film will be found on the part of the substrate that is immersed in the second liquid layer and is furthest away from the point where the first and second liquid layers meet. As a result, if a less concentrated second liquid layer is added to the coatings container first, followed by the careful addition of a more concentrate first liquid layer, the substrate will have a gradient thickness that decreases over the surface as one moves from the end first inserted into the coatings container toward the end that was last inserted, and vice versa.

It is also unimportant as to the order in which the first and second liquid layers and the initiator-coated substrate are added to the coatings container. For example, (1) the initiator-coated substrate can be added first and then the first and second liquid layers can be added, (2) one of the liquid layers can be added first followed by the initiator-coated substrate and then the other liquid layer, or (3) both liquid layers can be added and then the initiator-coated substrate can be added.

When the surface of the initiator-coated substrate is exposed to the first and second liquid layers, the PEGAA monomers contained therein form covalent bonds with the initiator molecules that are bonded to the surface of the substrate. The different PEGAA monomer concentrations of the two liquid layers that are being contacted with the initiator-coated substrate causes the liquid layer that is more concentrated to diffuse across the surface of the initiator-coated substrate to the liquid layer that is less concentrated, thereby resulting in the growth of a PEGAA film gradient having a graded increase/decrease in thickness across the surface of the substrate. For example, if layer one has a 2.1M concentration of PEGAA monomers and layer two is water having a zero concentration of monomers, the PEGAA monomers contained in layer one will diffuse into the water layer. As a result of the diffusion that is occurring, a monomer concentration gradient is formed, which leads to the growth of a gradient thin film. Accordingly, the process of the invention enables a PEGAA gradient film to be grown on the surface of an initiator-coated substrate in a controlled and stepwise manner, so that PEGAA gradient films having a specific thickness ranging from about 0.5 nm to about 5000 nm, preferably from about 5 nm to about 250 nm, most preferably from about 5 nm to about 100 nm can be produced.

In one preferred embodiment, for example, which is explained in a non-limiting, theoretical and simplified way for purposes of clarity only, an initiator-coated substrate, such as a silicon wafer is inserted into a simple coating container, such as a beaker. The first and second liquid layers are then carefully added in equal portions to the coating container so as to completely cover the initiator-coated substrate without causing the two layers to unduly mix. The two layers are not added to the coating container in any particular order, but the entire volume of each layer is added in a single separate and discrete step of addition. The first liquid layer contains PEGAA monomers in solution, at least one catalyst, optionally at least one ligand, and optionally a polar solvent. The second liquid layer is either a liquid having a lower concentration of PEGAA monomers, or no PEGAA monomers, such as for example plain water. The PEGAA monomers contained in the more concentrate first layer proceed to diffuse across the surface of the substrate from the first layer to the second layer forming a monomer concentration gradient, thereby enabling PEGAA monomers to be grown on the surface of the substrate in a gradient density as measured in distance units across the longitudinal surface of the substrate.

The initiator-coated substrate should remain in contact with the liquid layers for a length of time that is sufficient to allow a PEGAA gradient having the desired graded increase/decrease to be grown on the surface of the initiator-coated substrate. In general, the greater the difference in concentration between the two layers, the faster the rate at which the diffusion will occur and the shorter the amount of time that will be needed to grow a PEGAA gradient film on the initiator-coated substrate. In addition, increasing the temperature or pressure to which the two layers are subjected will increase the rate of diffusion. The faster the rate of diffusion, the quicker the gradient is formed and the more shallow or less steep the slope of the gradient will be. In contrast, the slower the rate of the diffusion, the more slowly the gradient is formed and the steeper the gradient slope will be.

As will be evident to a person of ordinary skill in the art, the diffusion rate will control the amount of time it takes to grow a gradient possessing the desired attributes. The diffusion rate is dependent on the viscosity of the solution, temperature, pressure, and other factors that are commonly known by a person of ordinary skill in the art. The amount of time needed to grow a PEGAA film gradient in accordance with this invention could take from a few seconds to a few weeks, more preferably from 5 minutes to 2 days, and most preferably from 15 minutes to 8 hours. As a result, the type of PEGAA film gradient being grown according to the process of the present invention can be controlled by adjusting the aforementioned parameters. Accordingly, a person of ordinary skill in the art may determine, using routine experimentation, the process parameters that are the most optimal in each individual situation.

The growth of the PEGAA polymer chains contained in the PEGAA film gradient are affected by both the concentration of the PEGAA to which the initiator-coated substrate is exposed, and the length of time the PEGAA chain is allowed to polymerize/grow. As a result, the graded increase/decrease in thickness of the PEGAA film gradient can be controlled by adjusting either the concentration of the PEGAA, or the length of time the PEGAA chain is permitted to grow/polymerize.

Figure 2:
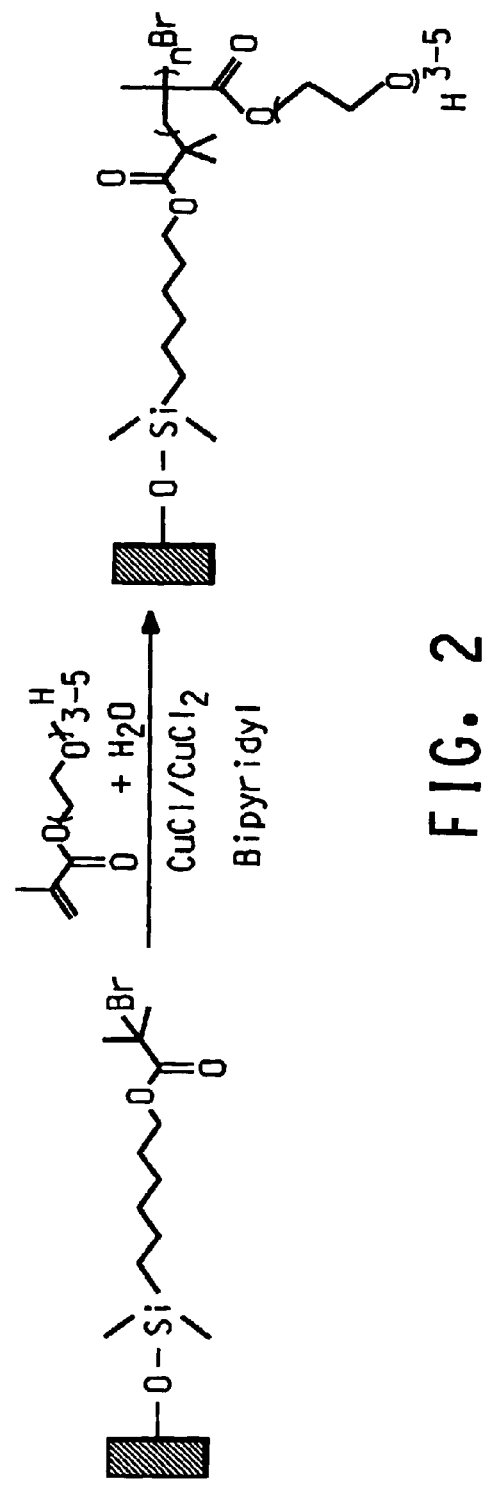
FIG. 2 shows the growth of a PEGAA film on a substrate using the SATRP process.

FIG. 2 further illustrates the two-step process of the invention involving first the self-assembly of a monolayer containing initiator molecules, and then the growth via SATRP of a PEGAA film gradient.

The PEGAA film gradient is grown on the substrate preferably at a temperature ranging from about 0° C. to about 150° C., more preferably at a temperature ranging from room temperature to about 50° C., and most preferably at room temperature.

Figure 10:
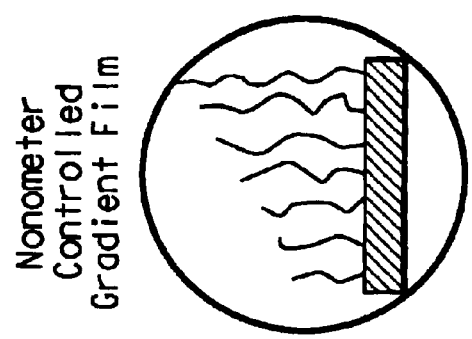
FIG. 10: is a scheme depicting an alternative method for growing a PEGAA film gradient on an initiator-coated substrate.
Figure 10:
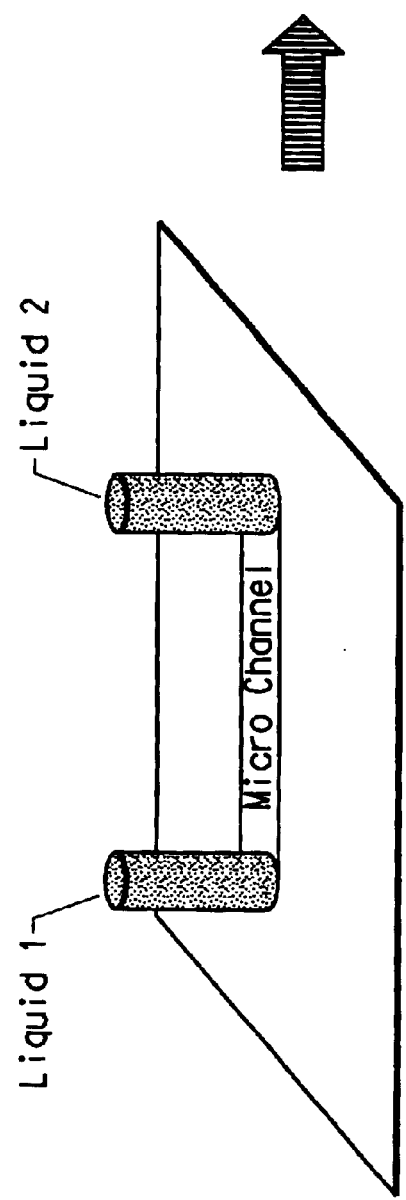

In an alternative embodiment, the first and second liquid layers are added to two separate coating containers that are connected with a micro-channel. The initiator-coated substrate can be comprised of either a separate substrate, or the micro-channel itself can be coated with the initiator molecule(s) in accordance with the process of the invention. This setup can be better understood by referring to FIG. 10. The first liquid layer contains PEGAA monomers in solution, a catalyst, and optionally at least one ligand and the second liquid layer comprises at least one liquid that is miscible with the first liquid layer. The portion of the substrate onto which the gradient is desired to be grown remains immersed in the liquid layers until a PEGAA gradient having the graded increase/decrease that is desired is grown on the initiator-coated substrate. In accordance with the process of this embodiment, a monomer concentration gradient is formed as the two liquid layers diffuse into and through the micro-channel. As the monomer concentration gradient is formed a PEGAA gradient is grown on the surface of the initiator-coated substrate. When water is used as the second liquid layer, the thickest part of the PEGAA gradient will be grown on the portion of the substrate that is located closest to the container with the second layer, and the thinnest portion of the gradient will be grown on the portion of the substrate that is located closest to the container with the first liquid layer.

A "micro-channel" as used herein is a conduit or means of communication, usually fluid communication, more particularly, liquid communication, between the elements of the present process. The elements in communication are, e.g., coating containers, cavity structures, and the like. Micro-channels include capillaries, grooves, trenches, microflumes, and so forth. The micro-channels may be straight, curved, serpentine, labyrinth-like or other convenient configuration within the planar substrate. The cross-sectional shape of the channel may be circular, ellipsoidal, trapezoidal, square, rectangular, triangular and the like so that it forms a microchannel within the planar substrate in which it is present.

Coating Container

The coating container is suitably sized and shaped to accommodate both the substrate having the thin PEGAA film gradient grown thereon, as well as, the layers of liquids added to the container. For example, the shape of the container can be cylindrical, square, etc., and the container can have any size that is capable of accommodating the substrate being coated and the individual liquid layers that are added thereto. The container can be made of any solid material that is nonreactive with the liquid layers, and is capable of retaining liquid.

Optional Spacer Molecules

In a further process of the present invention, the moiety accepting surface of the substrate can be contacted in step (a) with a mixture of initiator molecules, as set forth hereinabove, and spacer molecules. Examples of spacer molecules that can be used in accordance with the invention include, but are not limited to the following:

(a) alkyl chains having the following general formulas:
i)

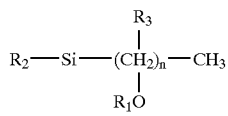

where n is an integer of 1 to 50; $R_1$ is a $CH_3$, $C_2H_5$, or an alkyl of 3 to 20 carbons; and $R_2$ and $R_3$ are each independently a $CH_3$, $C_2H_5$, $OR_1$, or an alkyl of 3 to 20 carbons, and ii)

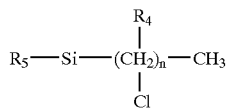

where n is an integer of 1 to 50; and $R_4$ and $R_5$ are each independently Cl, $CH_3$, $C_2H_5$, or an alkyl of 3 to 20 carbons;

(b) phenyl and phenyl derivatives having the following general formula

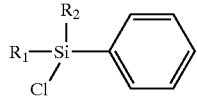

where $R_1$ and $R_2$ are each independently Cl, $CH_3$, $C_2H_5$, or an alkyl of 3 to 20 carbons; and (c) a mixture of alkyl chains and functional groups having the following general formula

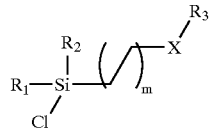

where m is an integer of 1 to 50; $R_1$ and $R_2$ are each independently Cl, $CH_3$, $C_2H_5$, or an alkyl of 3 to 20 carbons; $R_3$ is a phenyl, OH, $NH_2$, or an alkyl of 3 to 20 carbons; and X is an O, COO, or a CONH.

More specifically, the exemplary spacer molecules that may be used in accordance with the process of the present invention include the following:

a) An alkyl chain such as:
1. Alkyoxyl silanes with alkyl chains

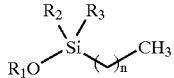

where $R_1$ is a $CH_3$, $C_2H_5$, or alkyl group; $R_2$ is a $CH_3$, $C_2H_5$, alkyl group, or $OR_1$; $R_3$ is a $CH_3$, $C_2H_5$, alkyl of 3 to 20 carbons, or $OR_1$; and n is an integer of 1 to 50.

For Example:

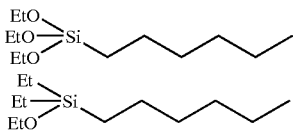

2) chlorosilanes with alkyl chains

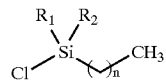

where $R_1$ is a Cl, $CH_3$, $C_2H_5$, or an alkyl of 3 to 20 carbons; $R_2$ is a Cl, $CH_3$, $C_2H_5$, or an alkyl of 3 to 20 carbons, and n is an integer of 1 to 50.

For example:

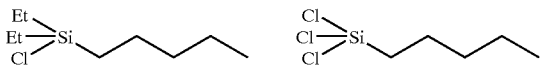

b) Phenyl and its derivatives

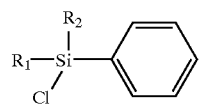

where $R_1$ is Cl, $CH_3$, $C_2H_5$, or an alkyl of 3 to 20 carbons; and $R_2$ is a Cl, $CH_3$, $C_2H_5$, or an alkyl of 3 to 20 carbons.

For example:

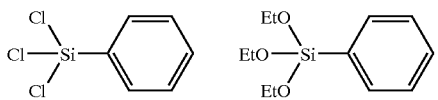

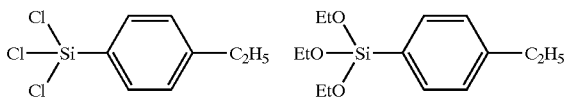

and c) A mixture of an alkyl chain and functional groups, for example:

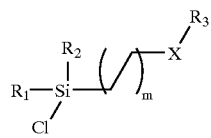

where $R_1$ is Cl, $CH_3$, $C_2H_5$, or an alkyl of 3 to 20 carbons; R2 is a Cl, $CH_3$, $C_2H_5$, or an alkyl of 3 to 20 carbons group; R3 is an alkyl of 3 to 20 carbons, phenyl, OH, or $NH_2$; X is an O, COO, or CONH; and m is an integer of 1 to 50.

For example:

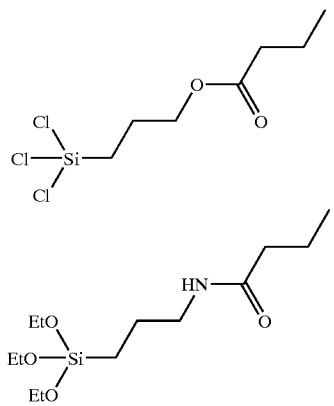

Figure 3:
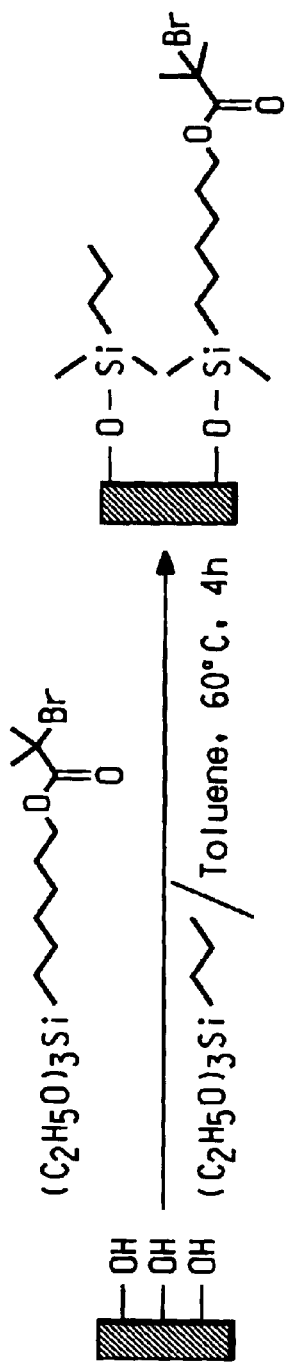
FIG. 3 shows the self-assembly of a monolayer containing spacer and initiator molecules onto the surface of a substrate.
Figure 4:
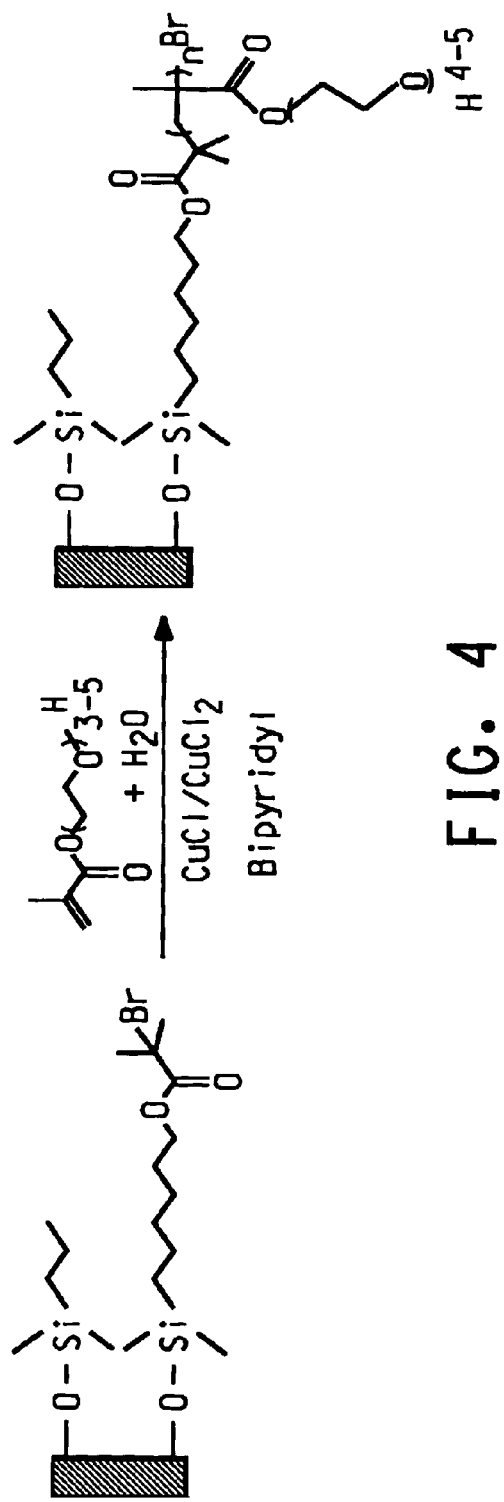
FIG. 4 shows the bonding of PEGAA polymer chains to the initiator molecules contained in a SAM comprised of both initiator and spacer molecules.

However, triethoxylpropylsilane is preferably used as the spacer molecule. FIG. 3 demonstrates the deposition of a SAM comprising an initiator molecule, such as 5'-(triethoxylsilylpentyl)2-bromo-2-methylpropionate, and a spacer molecule, such as triethoxylpropylsilane onto the hydroxylated surface of a substrate. FIG. 4 further demonstrates the growth of a PEGM film gradient in a controlled and stepwise manner on a SAM comprised of both spacer and initiator molecules.

When the SAM is comprised of both spacer and initiator molecules it is important to note that the PEGAA monomers are only bound to the initiator molecules, and not to the spacer molecules. The spacer molecules simply perform the role of neutral space-holders, thereby enabling the density of the PEGAA monomers that are being grown on the surface of the substrate to be controlled. The relative concentration of surface-bound initiator molecules to surface-bound spacer molecules can be selected based on the density of PEGAA desired or needed for a particular application. In general, the ratio of initiator molecules to spacer molecule ranges from 95:5 mol % to 1:99 mol %. However, some embodiments use 100 mol % of the initiator molecules and 0 mol % of the spacer molecules. In a preferred embodiment the initiator to spacer molecule ratio ranges from about 1:99 to about 99:1.

By utilizing the SATRP process to apply thin PEGAA film gradients to substrates, termination reactions are eliminated, which in turn results in the polydispersity index being lowered. Lowering the polydispersity index enables the molecular weight of the polymers to be controlled by controlling the concentration of the monomer, which relies on the equilibrium of the dormant and the active chain ends of the growing polymeric molecules, wherein equilibrium prefers the dormant chain ends.

This invention further allows the chemical groups that are attached to PEGAA polymer chains and are available on the surface of the thin PEGAA film gradients grown in accordance with the SATRP process of the present invention, to be further modified with specific functional groups, thereby enabling these modified chemical groups to be further utilized in additional applications or utilities. Polymer chains that are modified by attaching additional functional groups to their surfaces are called polymer brushes. For example, the polymer chains contained in the PEGAA film gradient could be further modified by having biological ligands designed to recognize specific proteins attached to their surface. Polymer brush formation can be better understood by referring to "Synthesis of Nanocomposite Organic/Inorganic Hybrid Materials Using Controlled/"Living "Radical Polymerization" by Pyun, et al., Chem. Mater. 2001, 13, 3436–3448, which is hereby incorporated by reference.

Figure 5:
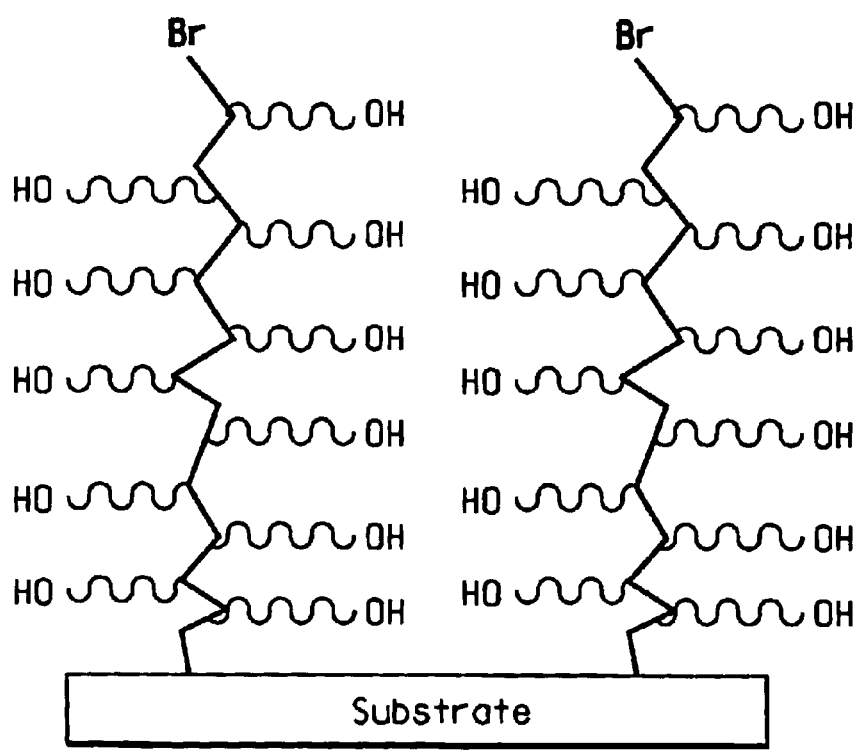
FIG. 5 is a cartoon depicting chemical group(s) attached to the surface of polymer chains grown on a substrate.

FIG. 5 depicts at least one example of an initiator-coated substrate surface that has PEGAA polymer chains, which have been grown on the surface in accordance with the process of the invention, attached thereto. As is evidenced by FIG. 5, the PEGAA chains have Br and OH chemical groups capable of reacting with various functional groups attached to their surface. More specifically, the surface of the PEGAA film gradient grown in accordance with the process of the invention can be 1) converted to a negatively charged surface by reacting the chemical group(s) attached thereto with functional groups, such as COOH, $SO_3H$, $PO_4$, etc.; 2) converted to a positively charged surface by reacting the chemical group(s) attached thereto with functional groups such as, $NR_3$, $NH_2$, DNA, etc., in order, for example, to produce a surface capable of killing bacteria; 3) converted to a biological ligand by reacting the chemical group(s) attached thereto with functionalized ADP, ATP, NADH, etc. in order, for example, to facilitate bioseparation processes; 4) lined with biological entities by reacting the chemical group(s) attached thereto with functionalized proteins, peptides, DNA, etc. in order, for example, to facilitate the discrimination or sorting of cells; and 5) linked with surface modified particles, such as metal nanoparticles, e.g. gold, silver, and copper and semiconductor nanoparticles, e.g. CdSe and ZnO in order, for example, to form metal-organic hybrid nanomaterials useful in the electronics and optics industries. PEGAA film gradient surfaces that are modified as set forth hereinabove can then be utilized, for example, as the surface material of a biological sensor. Biological sensors can be produced using standard techniques as generally described in U.S. Pat. App. Ser. No. 2002/0001845, which is hereby incorporated by reference.

EXPERIMENTAL

The present invention is further defined in the following Examples, in which all parts and percentages are by weight. It should be understood that these Examples are given by way of illustration only. From the above discussion and this Example, one skilled in the art can ascertain the essential characteristics of this invention, and without departing from the spirit and scope thereof, can make various changes and modifications of the invention to adapt it to various uses and conditions.

In accordance with the Examples, the following materials were used:

Singly polished undoped silicon wafers obtained from Silicon Valley Microelectronics, Inc. (San Jose, Calif.) having a thickness of 330–381±50 µm.

n-Propyl triethoxysilane was obtained from Gelest, Inc. (Morrisville, Pa.).

Initiator molecule: (5-Trichlorosilylpentyl)2-bromo-2-methyl propionate with a general formula of $(EtO)_3Si(CH_2)_6OCOC(CH_3)_2Br$. This compound was synthesized in a laboratory at DuPont Central R&D.

The following materials which were purchased from Aldrich Chemical Co., P.O. Box 2060, Milwaukee, Wis., 53201:

Polyethylene glycol methacrylate (Average MW 360)

Bipyridine

Copper(I) chloride (CuCl)

Copper(II) chloride ($CuCl_2$)

5-hexen-1-ol

Triethylamine $HSi(OCH_2CH_3)_2$ $Cp_2PtCl_2$ 2-bromo-2-methylpropionyl bromide

Toluene

Other organic solvents such as methylene chloride

EXAMPLE 1

Synthesis of Pent-4-enyl-2-bromo-2-methyl propionate Precursor

With continuous stirring, 1.46 mL of 5-hexen-1-ol (30.0 mmol) and 5.00 mL of triethylamine (30.0 mmol) were added at 0° C. and under a nitrogen gas atmosphere to a flask containing 16 mL of dry $CH_2Cl_2$. 8.27 mL of 2-bromo-2-methylpropionyl bromide (30.0 mmol) was added dropwise over 10 min to form a white triethylamine salt. The resulting solution was then stirred for 1 hour at 0° C. The solution was warmed to room temperature over the next 2.5 hours, and became darker brown in color. The precipitate was filtered off and rinsed with 50 mL methylene chloride. The filtrate was extracted 4 times with saturated aqueous ammonium hydroxide ($NH_4Cl$) and 4 times with $H_2O$. The crude brown oil was characterized and used in the next step of synthesis. HNMR (CDCl$_3$, δ in ppm): 5.9–6.0 (m, 1H), 5.1–5.2 (d, 2H), 4.3 (m, 2H), 2.2 (m, 2H), 2.1 (s, 6H), 1.8 (m, 2H), 1.6 (m, 2H). Mass Spectrum (CI): m/z 248.

EXAMPLE 2

Preparation of 5-Triethoxyl silyl pentyl 2-bromo-2-methyl propionate Initiator

In a flask equipped with a reflux condenser and a nitrogen purge, 0.698 g of pent-4'-enyl-2-bromo-2-methyl propionate (2.80 mmol) prepared in accordance with Example 1, 2 mL of $HSi(OCH_2CH_3)_2$ (10.8 mmol), and 5.0 mg $Cp_2PtCl_2$ (0.0125 mmol) were added to 5 mL of dry $CH_2Cl_2$ solvent and then stirred. The reaction was refluxed overnight in the dark. After 17 hrs of refluxing, the reaction mixture was cooled and the solvent and excess silane were removed under reduced pressure. The crude product was distilled (at 60 millitorr vacuum/135° C.) to yield a light brown oil product (62% overall yield). $^1$H NMR (CDCl$_3$, δ in ppm): 4.10–4.13 (t, 2H), 3.75–3.79 (q, 6H), 1.89 (s, 6H), 1.64 (m, 2 H), 1.35, (m, 6H), 1.17–1.21 (t, 9H), 0.59 (m, 2H). MS (CI): m/z 430 (M+NH$_4$), 412 (M+H), 384 (M–C$_2$H$_5$), 367 (M–C$_2$H$_5$O), 287, 245, 180.

EXAMPLE 3

Alternative Preparation of 5-Triethoxyl silyl pentyl 2-bromo-2-methyl propionate Initiator In accordance with the process of Example 2, 5-Triethoxyl silyl pentyl 2-bromo-2-methyl propionate was prepared using $H_2PtCl_6$ as the catalyst instead of $CP_2PtCl_2$. Since this catalyst showed good solubility in the reagents used, the reaction was run without using any solvent. The distilled product had the same spectral data as the Initiator produced in Example 2, with a yield near 65%.

EXAMPLE 4

Self-Assembling Initiator Monolayer on Silicon Substrate

Step 1: Silicon Surface Clean-Up

Figure 6:
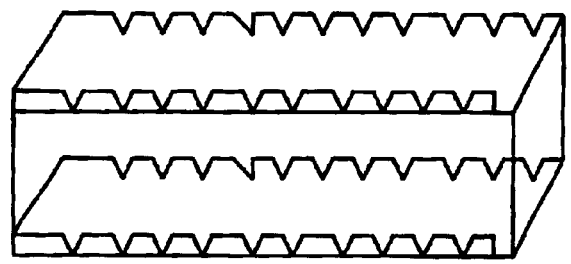
FIG. 6 is a scheme depicting a wafer holder.

The silicon wafers were cut into pieces of 24×30 mm$^2$ or 20×15 mm$^2$. Two special wafer holders (glass trays shown in FIG. 6) were designed and made to hold 1 to 10 wafers each. The wafers were treated with piranha solution (70% $H_2SO_4$+30% $H_2O_2$ (30% concentrate)) in a beaker for 30 min at 70° C. The wafers were then rinsed thoroughly with the Barnstead Nano-pure water (18.2 MΩ-cm), and dried in oven at 120° C. for 1 hour.

The piranha solution should be handled with extreme caution, as it tends to violently react with most organic materials. There should not be organic materials present in the area where the piranha solution is being used. The operator handling the piranha solution should be equipped with double safety gloves, for example, nitrile and neoprene, and should exercise any additional safety precautions that are warranted.

Step 2: Self-Assembling a 0.15% Solution of Initiator Molecules as a Monolayer

In preparing 150 mL of 0.15% 5-Triethoxyl silyl pentyl 2-bromo-2-methyl propionate, 0.225 mL of the 5-Triethoxyl silyl pentyl 2-bromo-2-methyl propionate Initiator prepared in accordance with either example 2 or 3 was added to 150 mL dried toluene, and stirred for 5 minutes. The solution was then transferred to a shallow beaker loaded with 40 pieces of clean wafers (15×20 mm$^2$ or 24×30 mm$^2$). The beaker was covered with aluminum foil and heated for four hours in an oil bath at 60° C. The reacted wafers were then rinsed with toluene and acetone, and baked in an oven at 110° C. for 1 hour. After baking, the film thickness of the assembled initiator monolayer was measured with an ellipsometer and determined to be 10.3 Å.

EXAMPLE 5

Growing a Polyethylene Glycol Methacrylate (PEGM) Film on the Surface of a Silicon Substrate In a typical reaction, a PEGM monomer mixture having a 1.5M concentration was prepared by adding 6.0 g of PEGM (MW 360) and 5.0 g of nanopure water to a 50 mL round-bottom flask. Then, 0.075 g of bipyridyl, 0.0054 g of $CuCl_2$ and 0.02 g CuCl were added to the flask under a nitrogen atmosphere. The flask was sealed with a rubber septum and the mixture was stirred for 10 min under a nitrogen atmosphere. 5 mL of said mixture was transferred by syringe to a flask charged with a wafer having an initiator monolayer assembled on the surface thereof in accordance with Example 4. The flask containing the wafer was flushed with N$_2$ for 5 minutes and then sealed with a rubber stopper before charging of the chemicals. The reaction was allowed to continue for a period of time ranging from 15 minutes to 72 hours depending on the film thickness desired. Thereafter, the wafer was rinsed with nanopure water and air-dried.

Subsequently, the thickness of the PEGM thin film was measured by an ellipsometer. Please see Table 1 contained herein below. For each of the measurements, the relative standard deviation (% RSD) is less than 3% indicating that the film surface is very uniform. In addition, the film thickness vs. reaction time is fitted with the following linear relationship: y=48.1x+79. Within 8 hours the PEGM film grows to 44.7 nm. The low relative standard deviation of the PEGM layer thickness is less than 10% indicating that the thickness of the PEGM layer can be very well controlled by the amount of time the PEGM layer is permitted to grow.

TABLE 1

PEGM Film Growth in Correlation to Polymerization Reaction Time.

| T (h) | Thickness (Å) | St. Dev (Å) |
| --- | --- | --- |
| 0.5 | 81.4 | 6.5 |
| 1 | 128.2 | 5.1 |
| 2.5 | 210 | 21.3 |

TABLE 1-continued

PEGM Film Growth in Correlation to Polymerization Reaction Time.

| T (h) | Thickness (Å) | St. Dev (Å) |
|---|---|---|
| 4 | 293.3 | 14.2 |
| 6 | 372.7 | 23.3 |
| 8 | 447.6 | |

NB: The average thickness values were obtained by repeating the same experiments at least 3 times.

EXAMPLE 6

Dependence of PEGM Film Growth on Monomer Concentration

The rate at which a PEGM film is grown on the surface of a substrate was found to depend on the rate of polymerization/growth, which in turn was found to depend on the concentration of the monomer in solution. A PEGM monomer mixture having a 2.1 M concentration was prepared by adding 6.0 g of PEGM (MW 360) and 2.0 g of nanopure water to a 50 mL round-bottom flask. Then, 0.075 g of bipyridyl, 0.0054 g of $CuCl_2$ and 0.02 g CuCl were added to the flask under a nitrogen atmosphere. The flask was then sealed with a rubber septum.

A PEGM monomer mixture having a 1.5 M concentration was prepared in accordance with Example 5, and then sealed inside the flask with a rubber septum.

After stirring both mixtures for 10 min under a nitrogen atmosphere, 5 mL of each mixture was transferred to separate 50 mL round-bottom flasks containing a wafer having an initiator monolayer in accordance with Example 4 assembled on its surface. Each flask was maintained at a nitrogen atmosphere. The reaction was conducted at room temperature for the periods of time as set forth in Table 2. At the end of each reaction, each wafer was rinsed with nanopure water and air-dried.

TABLE 2

PEGM Film Thickness in Correlation to the Concentration of Monomer in Solution

| Polymerization time (h) | PEGM Thickness (Å) at monomer concentration (C = 2.1 M) | PEGM thickness (Å) at monomer concentration (C = 1.5 M) |
|---|---|---|
| 0.5 | | 82.7 |
| 1 | | 127.9 |
| 1.25 | 59.2 | |
| 2.5 | 85.3 | 228.5 |
| 4 | 118.3 | 328.3 |
| 6 | | 399.5 |

EXAMPLE 7

Self-Assembling a Monolayer of Both Initiator and Spacer Molecules onto the Surface of a Substrate (a) Preparing a SAM Having an Initiator/Spacer Molar Ratio of 1:1

75 µL of the spacer n-propyl triethoxysilane and 150 µL of the initiator 5-Triethoxyl silyl pentyl 2-bromo-2-methyl propionate, which was prepared in accordance with either example 2 or 3, were combined in a 250 mL flask containing 150 mL of dried toluene. The mixture was stirred for 5 min, and then transferred to a beaker loaded with 20 pieces of clean wafers (1.5×2.0 cm²). The beaker was covered with aluminum foil and heated in an oil bath for 4 hours at 60° C. Then, the wafers were rinsed with toluene and acetone, and baked in an oven at 1 atmosphere at 110° C. for 1 hour.

(b) Preparing a SAM Having an Initiator/Spacer Molar Ratio of 1:10

187.5 µL of the spacer n-propyl triethoxysilane and 37.5 µL of the initiator 5-Triethoxyl silyl pentyl 2-bromo-2-methyl propionate were combined in a 250 mL flask containing 150 mL of dried toluene. The procedure recited in Example 7(a) was repeated.

(c) Preparing a SAM Having an Initiator/Spacer Molar Ratio of 1:50

216.3 µL of the spacer n-propyl triethoxysilane and 8.6 µL of the initiator 5-Triethoxyl silyl pentyl 2-bromo-2-methyl propionate were combined in a 250 mL flask containing 150 mL of dried toluene. The procedure recited in Example 7(a) was repeated.

(d) Preparing a SAM Having an Initiator/Spacer Molar Ratio of 1:100

220.6 µL of the spacer n-propyl triethoxysilane and 4.4 µL of the initiator 5-Triethoxyl silyl pentyl 2-bromo-2-methyl propionate were combined in a 250 mL flask containing 150 mL of dried toluene. The procedure recited in Example 7(a) was repeated.

EXAMPLE 8

Using SATRP to Control the Chain Density of a PEGM Film

The density of the polymers chains grown on the surface of a substrate is controlled by the density of the initiator molecules contained in the SAMs having initiator:spacer ratios, for example of 1:1, 1:10, 1:50 and 1:100. Accordingly, the wafers prepared in accordance with Example 7, were further contacted with PEGM in accordance with the process of Example 5. More specifically, a solution having a PEGM monomer concentration of 1.5 M, was prepared by adding 6.0 g of PEGM (MW 360) and 5.0 g of nanopure water to a 50 mL round-bottom flask. Then, 0.075 g of bipyridyl, 0.0054 g of $CuCl_2$ and 0.02 g CuCl were added to the flask under a nitrogen atmosphere and the flask was sealed with a rubber septum.

After stirring the mixture for 10 min under a nitrogen atmosphere, 5 mL of the mixture was transferred to different 50 mL round-bottom flasks each of which contained a wafer prepared in accordance with examples 7(a), (7(c) and 7(d). A nitrogen atmosphere was maintained in the flask. The reaction was conducted at room temperature for the desired period of time. At the end of the reaction, each wafer was rinsed with nanopure water and air-dried.

EXAMPLE 9

Ellipsometrically Measuring the Thickness of the PEGM Film

The thickness of the initiator monolayer 5-Triethoxyl silyl pentyl 2-bromo-2-methyl propionate in combination with the PEGM film grown on the surface of the silicon wafers in accordance with Example 8 was measured by a null-ellipsometer (Rudolph Auto EL-II, Fairfield, N.J.). The wavelength of the laser beam employed for the measurement was 632.8 nm, and the angle of incidence was 70°. The refractive index of PEGM was estimated to be 1.54. The thickness was reported as an average of ten measurements on a given sample of film. The oxide layer ($SiO_2$) on the bare silicon wafer was determined to be 18.2 Å thick. The thickness of the PEGM film layer in combination with the initiator monolayer was obtained by subtracting the contribution of the oxide layer.

TABLE 3

Comparing PEGM Film Thickness with the Surface Density of Initiator Deposited on the Surface of the Substrate.

| Polymerization time (h) | PEGM film thickness (Å) (50% initiator) | PEGM film thickness (Å) (2% initiator) | PEGM film thickness (Å) (1% initiator) |
|---|---|---|---|
| 0.5 | 83.7 | 56.1 | 49.2 |
| 1 | 127.9 | 81.9 | 73.4 |
| 2.5 | 228.5 | 140.1 | 125.3 |
| 4 | 328.3 | 203.7 | 178.1 |
| 6 | 399.5 | 250.9 | 241.3 |

EXAMPLE 10

Preparing a Thin Nanometer-controlled PEGM Film Gradient Using Different Concentrations of PEGM Monomer Solution (a) A PEGM Monomer Solution Having a Concentration of 2.1M.

Figure 7:
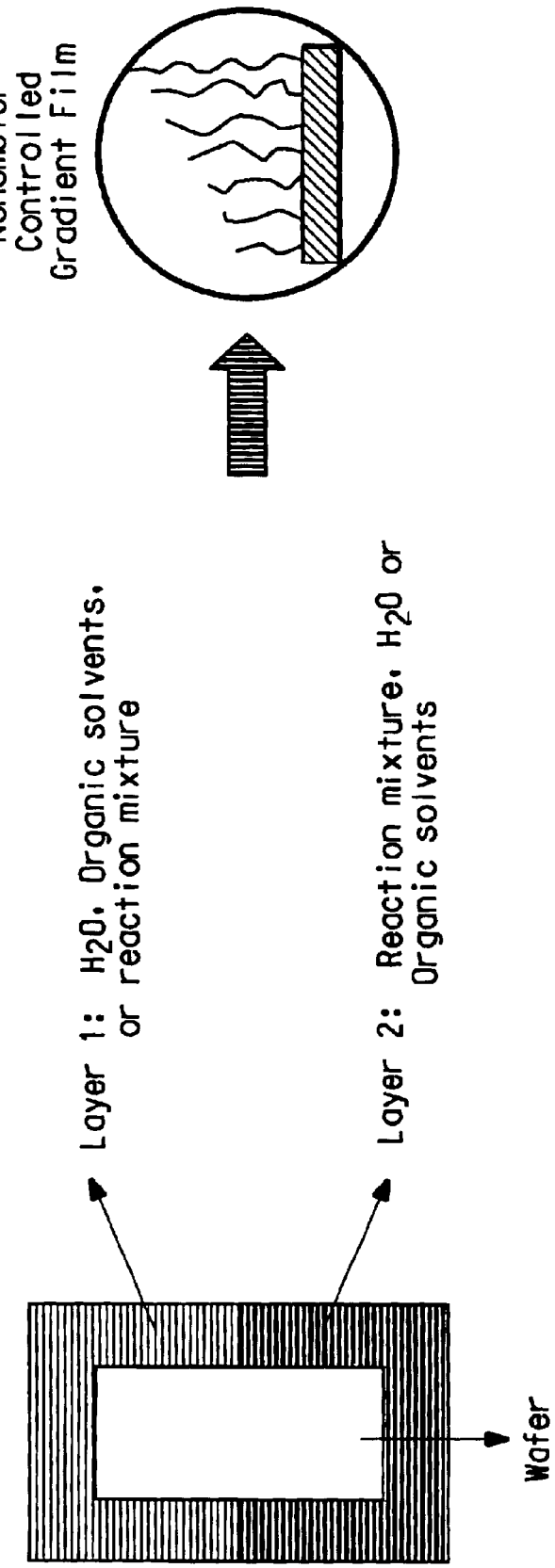
FIG. 7: shows how a two-layer system is used to generate a thin PEGAA polymer film gradient.

An aqueous PEGM monomer solution was prepared by adding 45.0 g of PEGM (MW 360),15.0 g nanopure water, 0.56 g of bipyridyl, 0.041 g of $CuCl_2$ and 0.15 g CuCl to a 250 mL round bottom flask under a nitrogen atmosphere. The flask was sealed with a rubber septum and the mixture was stirred for 15 minutes to form a homogeneous solution. A 24 mm×30 mm (width×height) silicon wafer piece having an initiator monolayer assembled thereon in accordance with example 4 was placed in a 140 mL beaker in upright end-on-end longitudinal position as shown in FIG. 7. The 140 mL beaker was then placed in an oven filled with $N_2$. Prior to being filled with $N_2$ the oven was evacuated. The well-mixed PEGM monomer solution prepared hereinabove was carefully added to the 140 mL beaker so as to form a first layer of PEGM monomer solution that covered ⅔ of the silicon wafer. A pipette was then used to gently add 30 mL of nanopure water to the 140 mL beaker so as to form a second layer of nanopure water, thereby causing the rest of the wafer to be completely covered by the second layer of this two-layer system. In order to prevent the nanopure water from penetrating the PEGM layer, the tip of the pipette was gently pressed against the glass wall of the beaker so as to enable the nanopure water to gently cascade down the beaker wall and form a second layer directly on top of the first PEGM layer. The beaker was covered with aluminum foil. The oven was then pumped to form a vacuum and slowly filled with nitrogen to keep a positive pressure for the polymerization reaction. After reacting at room temperature for 4 hours, the wafers were rinsed with nanopure water and dried with air-flow.

The thickness of the thin PEGM film gradient was measured with a null-ellipsometer (Rudolph Auto EL-II, Fairfield, N.J.) at various points across the wafer. The wavelength of the laser beam was 632.8 nm, and the angle of incidence was 70°. The refractive index of PEGM was estimated to be 1.54. Each sample was measured in 10 spots, and the average value was taken as the thickness of the film. The oxide layer (SiO2) on the bare silicon wafer was determined to be 18.2 Å. The thickness of the PEGAA film gradient (which included the initiator monolayer) was obtained by subtracting the contribution of the oxide layer.

Figure 8:
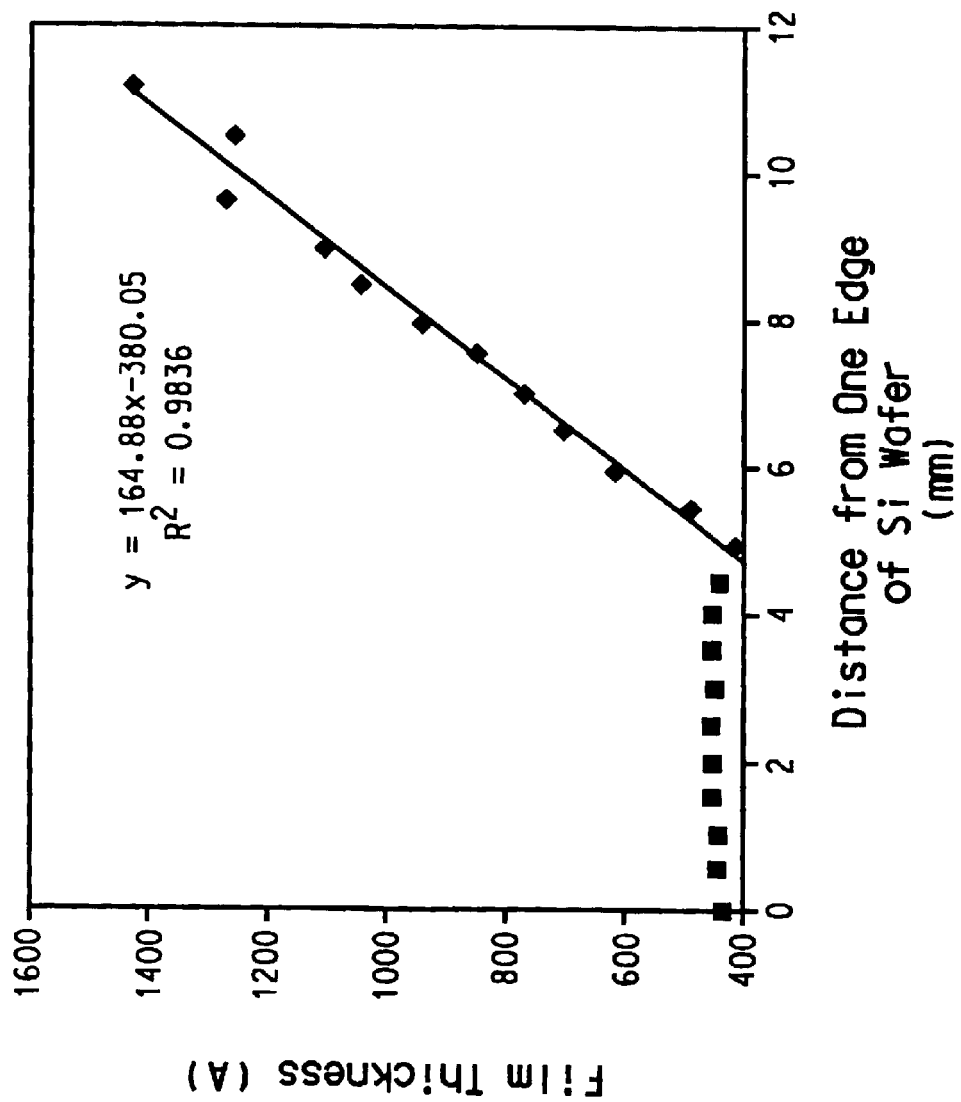
FIG. 8: is a chart depicting the growth of a thin PEGM film gradient on the moiety accepting surface of a substrate.

A graph of the resulting measurements is depicted in FIG. 8. The measurements were taken at intervals beginning at the end of the wafer resting on the bottom of the beaker. The bottom end of the wafer will be identified hereinafter with regard to the 24 mm×30 mm silicon wafer dimensions as the 0 mm end of the wafer. The PEGM film gradient thickness grown on the wafer as measured from 0 mm to 4.5 mm stayed constant at 450 Å, indicating that the 4 hour reaction time period was not long enough to enable the nanopure water layer to diffuse into the PEGM monomer layer covering the 0 to 4.5 mm portion of the silicon wafer. The PEGM film gradient thickness as measured from the 4.5 mm portion of the silicon wafer and up, however, resulted in a linear increase of PEGM film thickness from 450 Å to 1,400 Å. The linear increase in PEGM film thickness was probably caused by the PEGM monomer concentration gradient, which formed when the nanopure water layer diffused into the PEGM monomer layer. The gradient slope was 165 Å/mm.

(b) A PEGM Monomer Solution Having a Concentration of 1.5M.

An aqueous PEGM monomer solution was prepared by adding 90.0 g of PEGM (MW 360), 75.0 g of nanopure water, 1.025 g of bipyridyl, 0.081 g of $CuCl_2$ and 0.30 g CuCl to a 250 mL round bottom flask under a nitrogen atmosphere. The flask was sealed with a rubber septum and the mixture was stirred for 15 minutes to form a homogeneous solution. A 15 mm×20 mm (width×height) silicon wafer piece having an initiator monolayer assembled thereon in accordance with example 4 was placed in a 250 mL square beaker in an upright end-on-end longitudinal position as shown in FIG. 7. The 250 mL beaker was then placed in an oven filled with $N_2$. Prior to being filled with $N_2$ the oven was evacuated. The well-mixed PEGM monomer solution prepared hereinabove was carefully added to the 250 mL beaker so as to form a first layer of PEGM monomer solution that covered ⅔ of the silicon wafer. A pipette was then used to gently add 60 mL of nanopure water to the 250 mL beaker so as to form a second layer of nanopure water, thereby causing the rest of the wafer to be completely covered by the second layer of this two-layer system. In order to prevent the nanopure water from penetrating the PEGM layer, the tip of the pipette was gently pressed against the glass wall of the beaker so as to enable the nanopure water to gently cascade down the beaker wall and form a second layer directly on top of the first PEGM layer. The beaker was covered with aluminum foil. The oven was then pumped to form a vacuum and slowly filled with nitrogen to keep a positive pressure for the polymerization reaction. After reacting at room temperature for 2.5 hours, the wafers were rinsed with nanopure water and dried with air-flow.

The thickness of the thin PEGM film gradient was measured with a null-ellipsometer (Rudolph Auto EL-II, Fairfield, N.J.) at various points across the wafer. The wavelength of the laser beam was 632.8 nm, and the angle of incidence was 70°. The refractive index of PEGM was estimated to be 1.54. Each sample was measured in 10 spots, and the average value was taken as the thickness of the film. The oxide layer (SiO2) on the bare silicon wafer was determined to be 18.2 Å. The thickness of the PEGM film gradient (which included the initiator monolayer) was obtained by subtracting the contribution of the oxide layer.

The measurements were taken at intervals beginning at the end of the wafer resting on the bottom of the beaker. The bottom end of the wafer will be identified hereinafter with regard to the 15 mm×20 mm silicon wafer dimensions as the 0 mm end of the wafer. The thickness of the PEGM film gradient that grew on the wafer as measured from the 0 mm to the 15 mm end increased from 200 Å to 700 Å and had a film gradient slope of 33 Å/mm. The nanopure water layer completely diffused into the PEGM monomer layer indicating that the film gradient slope can be controlled by the concentration of the PEGM monomer layer and the diffusion distance.

EXAMPLE 11

Using Bulk Polymerization to Prepare a Thin Nanometer-Controlled PEGAA Film Gradient 90.0 g of PEGM (MW 360) monomers in solution, 1.025 g of bipyridyl, 0.081 g of $CuCl_2$ and 0.30 g CuCl were added to a 250 mL round bottom flask under a nitrogen atmosphere. The flask was sealed with a rubber septum and the mixture was stirred for 15 minutes to form a homogeneous solution. A 24 mm×30 mm (width×height) silicon wafer piece having an initiator monolayer assembled thereon in accordance with example 4 was placed in a 140 mL beaker in an upright end-on-end longitudinal position as shown in FIG. 7. The 140 mL beaker was then placed in an oven filled with $N_2$. Prior to being filled with $N_2$ the oven was evacuated. The well-mixed PEGM monomer solution prepared hereinabove was carefully added to the 140 mL beaker so as to form a first layer of PEGM monomer solution that covered ⅔ of the silicon wafer. A pipette was then used to gently add 60 mL of nanopure water to the 250 mL beaker so as to form a second layer of nanopure water, thereby causing the rest of the wafer to be completely covered by the second layer of this two-layer system. In order to prevent the nanopure water from penetrating the PEGM layer, the tip of the pipette was gently pressed against the glass wall of the beaker so as to enable the nanopure water to gently cascade down the beaker wall and form a second layer directly on top of the first PEGM layer. The beaker was covered with aluminum foil. The oven was then pumped to form a vacuum and slowly filled with nitrogen to keep a positive pressure for the polymerization reaction. After reacting at room temperature for 5 hours, the wafers were rinsed with nanopure water and dried with air-flow.

Figure 9:
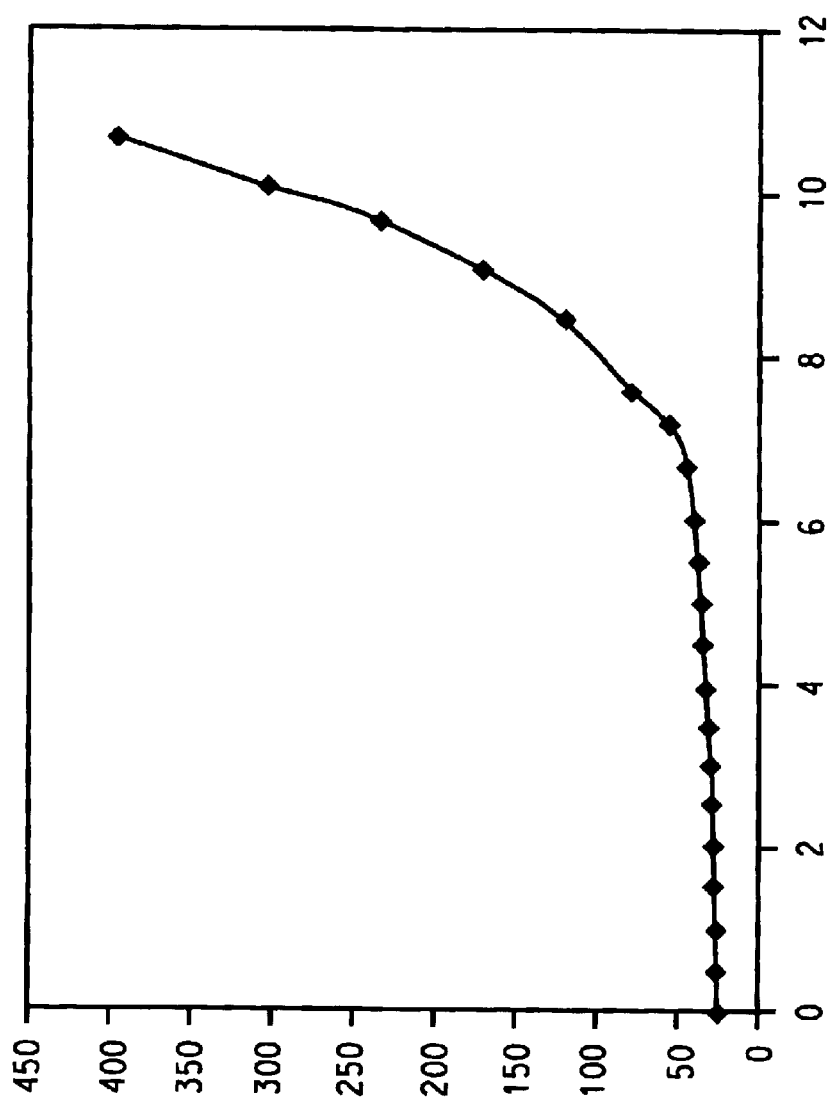
FIG. 9: is a chart depicting the growth of a thin PEGM film gradient using bulk polymerization.

The thickness of the thin PEGM film gradient was measured with a null-ellipsometer (Rudolph Auto EL-II, Fairfield, N.J.) at various points across the wafer, as shown in FIG. 9. The wavelength of the laser beam was 632.8 nm, and the angle of incidence was 70°. The refractive index of PEGM was estimated to be 1.54. Each sample was measured in 10 spots, and the average value was taken as the thickness of the film. The oxide layer (SiO2) on the bare silicon wafer was determined to be 18.2 Å. The thickness of the PEGAA film gradient (which included the initiator monolayer) was obtained by subtracting the contribution of the oxide layer.

FIG. 9 indicates that not adding water to the liquid layer containing the PEGM in solution will cause a different monomer concentration gradient to be formed, which will affect the graded increase in thickness of the PEGM gradient film being grown on the initiator-coated substrate.

I claim:

1. A process for growing a polyethylene glycol alkyl acrylate polymer film gradient on a substrate having a moiety accepting surface comprising the step of:

(a) contacting at least one initiator molecule with the moiety accepting surface of a substrate to form an initiator coated substrate, said initiator molecule comprising at least one of i)

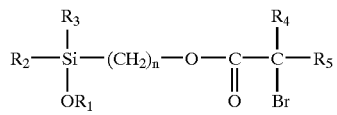

wherein:

n is an integer of 1 to 50;

$R_1$ and $R_4$ are each independently a $CH_3$, $C_2H_5$, or an alkyl of 3 to 20 carbons;

$R_2$ and $R_3$ are each independently a $CH_3$, $C_2H_5$, $OR_1$, or an alkyl of 3to 20 carbons; and $R_5$ is a H, $CH_3$, $C_2H_5$, or an alkyl of 3 to 20 carbons,

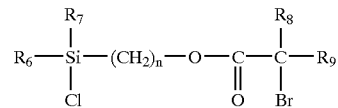

ii)

wherein:

n is an integer of 1 to 50;

$R_6$ and $R_7$ are each independently Cl, $CH_3$, $C_2H_5$, or an alkyl of 3 to 20 carbons;

$R_8$ is a $CH_3$, $C_2H_5$, or an alkyl of 3 to 20 carbons; and $R_9$ is a H, $CH_3$, $C_2H_5$, or an alkyl of 3 to 20 carbons, and iii) mixtures thereof;

(b) adding a first and second layer of liquid to a coating container, said first and second layer of liquid being added as separate discreet additions to said container; wherein said first liquid layer comprises polyethylene glycol alkyl acrylate monomers in solution and said second liquid layer comprises a liquid having a different polyethylene glycol alkyl acrylate monomer concentration than said first liquid layer;

wherein said polyethylene glycol alkyl acrylate monomer has the general formula

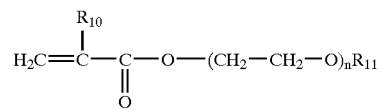

wherein:

n is an integer of 1 to 100; and $R_{10}$ and $R_{11}$ are each independently H, CH3, $C_2H_5$, or an alkyl of 1 to 20 carbons; and wherein at least one catalyst and optionally at least one ligand are added to the first liquid layer comprising the polyethylene glycol alkyl acrylate monomer;

(c) inserting the initiator-coated substrate of step (a) into the coating container; and (d) allowing a sufficient amount of time for diffusion of the polyethylene glycol alkyl acrylate monomer to occur between said first and second liquid layers, wherein a polyethylene glycol alkyl acrylate gradient is grown on the surface of the initiator-coated substrate.

2. The process according to claim 1, wherein the moiety accepting surface of the substrate is further contacted in step (a) with at least one spacer molecule, wherein said spacer molecule comprises at least one of (i) alkyl chains having the following general formulas

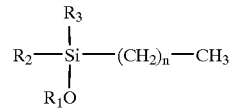

wherein:

n is an integer of 1 to 50;

$R_1$ is a $CH_3$, $C_2H_5$, or an alkyl of 3 to 20 carbons;

$R_2$ and $R_3$ are each independently a $CH_3$, $C_2H_5$, $OR_1$, or an alkyl of 3 to 20 carbons; and

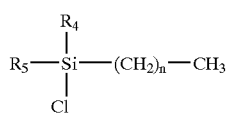

wherein:
n is an integer of 1 to 50;
$R_4$ and $R_5$ are each independently Cl, $CH_3$, $C_2H_5$, or an alkyl of 3 to 20 carbons;

(ii) phenyl and phenyl derivatives having the following general formula

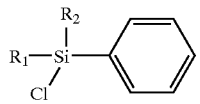

wherein:
$R_1$ and $R_2$ are each independently Cl, $CH_3$, $C_2H_5$, or an alkyl of 3 to 20 carbons; and (iii) a mixture of alkyl chains and functional groups having the following general formula

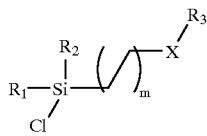

wherein:
m is an integer of 1 to 50;
$R_1$ and $R_2$ are each independently Cl, $CH_3$, $C_2H_5$, or an alkyl of 3 to 20 carbons;
$R_3$ is a phenyl, OH, $NH_2$, or an alkyl of 3 to 20 carbons; and
X is an O, COO, or a CONH.

3. The process according to claim 2, wherein the spacer molecule is n-propyl triethoxysilane.

4. The process according to claim 2, wherein the initiator to spacer molecule ratio ranges from about 1:99 to about 99:1.

5. The process according to claim 1 or 2, wherein the initiator molecule is 5'-(triethoxylsilylpentyl) 2-bromo-2-methylpropionate.

6. The process according to claim 1 or 2, wherein the polyethylene glycol alkyl acrylate monomer is polyethylene glycol methacrylate.

7. The process according to claim 1 or 2, wherein the substrate is selected from the group consisting of glass, metal oxide, silicon, fabric, quartz, zirconia and polymeric resins.

8. The process according to claim 1 or 2, wherein the polyethylene glycol alkyl acrylate film gradient grown on the surface of the substrate has a thickness ranging from about 0.5 nm to about 5000 nm.

9. The process according to claim 1 or 2, wherein the polyethylene glycol alkyl acrylate film gradient grown on the surface of the substrate has a polyethylene glycol alkyl acrylate chain density ranging from about 0.5% to about 100%.

10. The process according to claim 1 or 2, wherein the second liquid layer is water.

11. The process according to claim 1 or 2, wherein the second liquid layer is selected from the group consisting of a polyethylene glycol alkyl acrylate monomer solution having a lower concentration of polyethylene glycol alkyl acrylate monomers than the first liquid layer, a polyethylene glycol alkyl acrylate monomer solution having a higher concentration of polyethylene glycol alkyl acrylate monomers than the first liquid layer, an organic solvent, and a polar solvent.

12. The process according to claim 11, wherein said polar solvent is water.

13. The process according to claim 1 or 2, further comprising baking the substrate after said substrate is coated with the at least one initiator molecule in step (a), wherein said substrate is baked in an oven at a temperature ranging from 100° C. to 180° C. for a time period ranging from 30 minutes to 10 hours.

14. The process according to claim 1 or 2, wherein the first liquid layer of step (b) further comprises a polar solvent.

15. The process according to claim 14, wherein the polar solvent is water.

16. The process according to claim 1 or 2, wherein step (a) is performed in the presence of a solvent.

17. The process according to claim 16, wherein said solvent is selected from the group consisting of water, hydrocarbons, ethers, halogenated hydrocarbons, ketones, methyl ethyl ketones, methyl isobutyl ketones, alcohols, nitrites, esters, carbonates, inorganic solvents, and mixtures thereof.

18. The process according to claim 1 or 2, wherein the ligand is selected from the group consisting of 2,2'-bipyridyl, 1,10-phenanthroline, an alkylamine, a polyamine, and a trialkoxyaluminum.

19. The process according to claim 1 or 2, wherein the catalyst is selected from the group consisting of cuprous chloride, cupric chloride, cuprous bromide, cuprous iodide, cuprous cyanide, cuprous oxide, cuprous acetate, cuprous perchlorate, a tristriphenylphosphine complex of divalent ruthenium ($RuCl_2(PPh_3)_3$), and tristriphenylphosphine complex of divalent iron ($FeCl_2(PPh_3)_3$).

20. A process for growing a polyethylene glycol methacrylate gradient film on a substrate having a hydroxylated surface comprising the steps of
(a) contacting 5'-(triethoxylsilylpentyl)2-bromo-2-methylpropionate with the hydroxylated surface of the substrate in the presence of toluene to form an initiator-coated substrate;
(b) inserting said initiator-coated substrate into a container sized to accommodate the initiator-coated substrate;
(c) adding a first and second layer of liquid to a coating container, said first and second layer of liquid being added as separate discreet additions to said container; wherein said first liquid layer comprises polyethylene glycol methacrylate monomers in solution, bipyridyl, cuprous chloride, cupric chloride and water;
wherein said second liquid layer comprises water; and
(d) allowing a sufficient amount of time for diffusion of the polyethylene glycol methacrylate monomers to occur between said first and second liquid layers, wherein a polyethylene glycol methacrylate gradient is grown on the surface of the initiator-coated substrate.

21. The process according to claim 20, wherein the hydroxylated surface of the substrate is further contacted in step (a) with n-propyl triethoxysilane.

22. A process for growing a polyethylene glycol alkyl acrylate polymer film gradient on a substrate having a moiety accepting surface comprising the steps of
(a) contacting at least one initiator molecule with the moiety accepting surface of a substrate to form an initiator coated substrate, said initiator molecule comprising at least one of i)

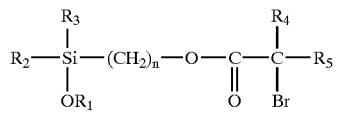

wherein:
n is an integer of 1 to 50;
$R_1$ and $R_4$ are each independently a $CH_3$, $C_2H_5$, or an alkyl of 3 to 20 carbons;
$R_2$ and $R_3$ are each independently a $CH_3$, $C_2H_5$, $OR_1$, or an alkyl of 3 to 20 carbons; and
$R_5$ is a H, $CH_3$, $C_2H_5$, or an alkyl of 3 to 20 carbons,

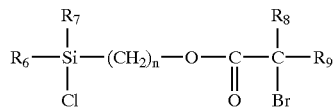

ii)
wherein:
n is an integer of 1 to 50;
$R_6$ and $R_7$ are each independently Cl, $CH_3$, $C_2H_5$, or an alkyl of 3 to 20 carbons;
$R_8$ is a $CH_3$, $C_2H_5$, or an alkyl of 3 to 20 carbons; and
$R_9$ is a H, $CH_3$, $C_2H_5$, or an alkyl of 3 to 20 carbons, and
iii) mixtures thereof;
(b) adding a first and second liquid layer to two separate coating containers;
wherein the two separate coating containers are connected with a micro-channel;
wherein said first liquid layer comprises polyethylene glycol alkyl acrylate monomers in solution and said second liquid layer comprises a liquid having a different polyethylene glycol alkyl acrylate monomer concentration than said first liquid layer;
wherein said polyethylene glycol alkyl acrylate monomer has the general formula

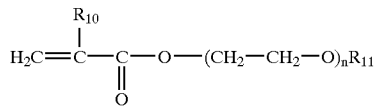

wherein:
n is an integer of 1 to 100; and
$R_{10}$ and $R_{11}$ are each independently H, CH3, $C_2H_5$, or an alkyl of 1 to 20 carbons; and
wherein at least one catalyst, optionally at least one ligand, and optionally a polar solvent are added to the first liquid layer;
(c) inserting the initiator-coated substrate of step (a) into the micro-channel; and
(d) allowing a sufficient amount of time for diffusion of the polyethylene glycol alkyl acrylate monomer to occur between said first and second liquid layers, wherein a polyethylene glycol alkyl acrylate gradient is grown on the surface of the initiator-coated substrate.

23. The process according to claim 22, wherein the moiety accepting surface of the substrate is further contacted in step (a) with at least one spacer molecule, wherein said spacer molecule comprises at least one of
(i) alkyl chains having the following general formulas

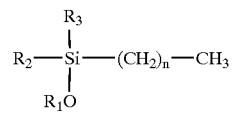

wherein:
n is an integer of 1 to 50;
$R_1$ is a $CH_3$, $C_2H_5$, or an alkyl of 3 to 20 carbons;
$R_2$ and $R_3$ are each independently a $CH_3$, $C_2H_5$, $OR_1$, or an alkyl of 3 to 20 carbons; and

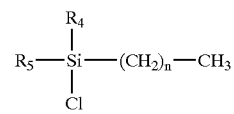

wherein:
n is an integer of 1 to 50;
$R_4$ and $R_5$ are each independently Cl, $CH_3$, $C_2H_5$, or an alkyl of 3 to 20 carbons;
(ii) phenyl and phenyl derivatives having the following general formula

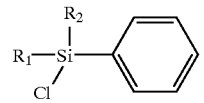

wherein:
$R_1$ and $R_2$ are each independently Cl, $CH_3$, $C_2H_5$, or an alkyl of 3 to 20 carbons; and
(iii) a mixture of alkyl chains and functional groups having the following general formula

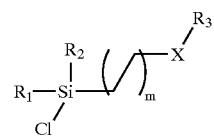

wherein:
m is an integer of 1 to 50;
$R_1$ and $R_2$ are each independently Cl, $CH_3$, $C_2H_5$, or an alkyl of 3 to 20 carbons;
$R_3$ is a phenyl, OH, $NH_2$, or an alkyl of 3 to 20 carbons; and
X is an O, COO, or a CONH.

* * * * *